US008179631B2

(12) United States Patent
Aoyagi et al.

(10) Patent No.: US 8,179,631 B2
(45) Date of Patent: May 15, 2012

(54) MAGNETIC DISK DRIVE FEED-THROUGH SOLDER CONNECTION WITH SOLDER FILLET FORMED INSIDE BASE AND PROTRUDING OUTSIDE BASE

(75) Inventors: Akihiko Aoyagi, Kanagawa (JP); Teruhiro Nakamiya, Kanagawa (JP); Takashi Kouno, Ibaraki (JP); Hitoshi Shindo, San Jose, CA (US); Tetsuya Nakatsuka, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 868 days.

(21) Appl. No.: 12/148,697

(22) Filed: Apr. 21, 2008

(65) Prior Publication Data

US 2008/0259503 A1    Oct. 23, 2008

(30) Foreign Application Priority Data

Apr. 19, 2007    (JP) .................................. 2007-110485

(51) Int. Cl.
*G11B 33/12* (2006.01)
(52) U.S. Cl. .................................................. 360/97.01
(58) Field of Classification Search ............... 360/97.01, 360/97.02, 97.03, 98.01, 264.2, 266.3; 439/78
See application file for complete search history.

(56) References Cited

U.S. PATENT DOCUMENTS

| 5,632,628 | A  | * | 5/1997 | Wagner ........................... 439/78 |
| 6,934,126 | B1 | * | 8/2005 | Berding et al. ............. 360/97.01 |
| 7,872,836 | B2 | * | 1/2011 | Shindo et al. ................. 360/319 |
| 7,876,527 | B2 | * | 1/2011 | Nakamiya et al. ......... 360/97.02 |
| 2005/0068666 | A1 |   | 3/2005 | Albrecht et al. |
| 2008/0024908 | A1 | * | 1/2008 | Nakamiya et al. ......... 360/97.02 |
| 2008/0165449 | A1 | * | 7/2008 | Shindo et al. .............. 360/97.02 |

* cited by examiner

*Primary Examiner* — Craig A. Renner
(74) *Attorney, Agent, or Firm* — Brokaw Patent Law PC; Christopher J. Brokaw

(57) ABSTRACT

Embodiments of the present invention help to achieve a solder joining structure having high reliability, in which even if a componental material of a flange of a feed-through of a sealed magnetic disk drive is an iron-based material such as Kovar™, and a componental material of a base of the drive is an aluminum-based alloy, leakage of low-density gas is dramatically reduced. According to one embodiment, a base has a stepped portion in the inside of a periphery of an opening, and an inclined surface extending to the outside of the base is formed at an edge of a surface of the stepped portion, on which a flange of a feed-through is placed, thereby when the stepped portion of the base is joined by soldering with the flange of the feed-through, a solder fillet is formed not only in the inside of the base, but also in the outside thereof.

9 Claims, 14 Drawing Sheets

Fig.5
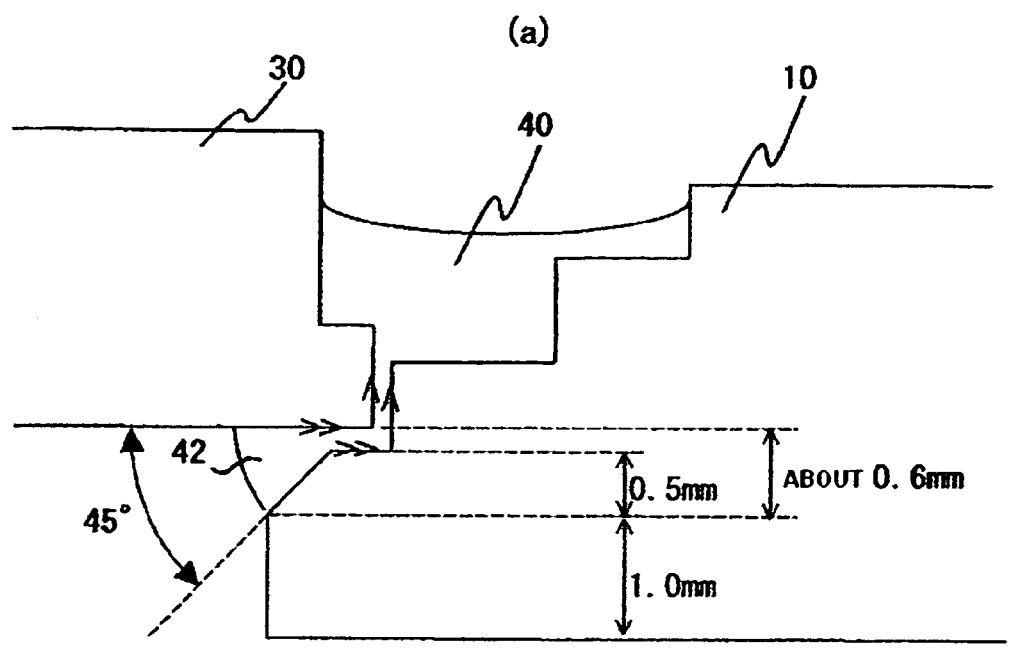
(a)
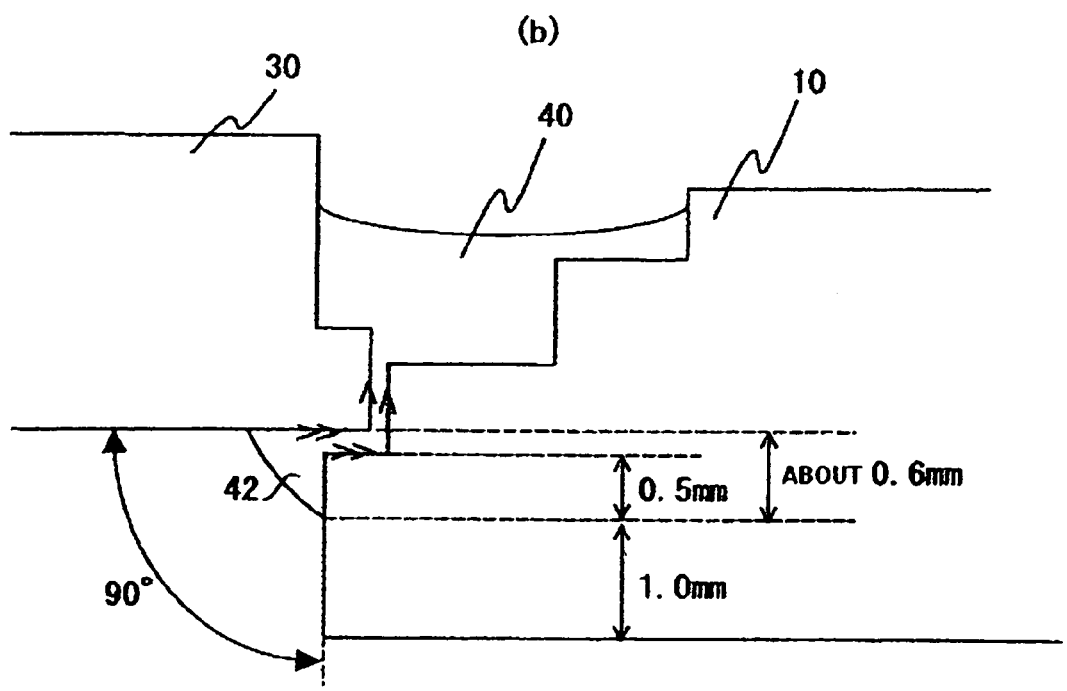
(b)

Fig.6
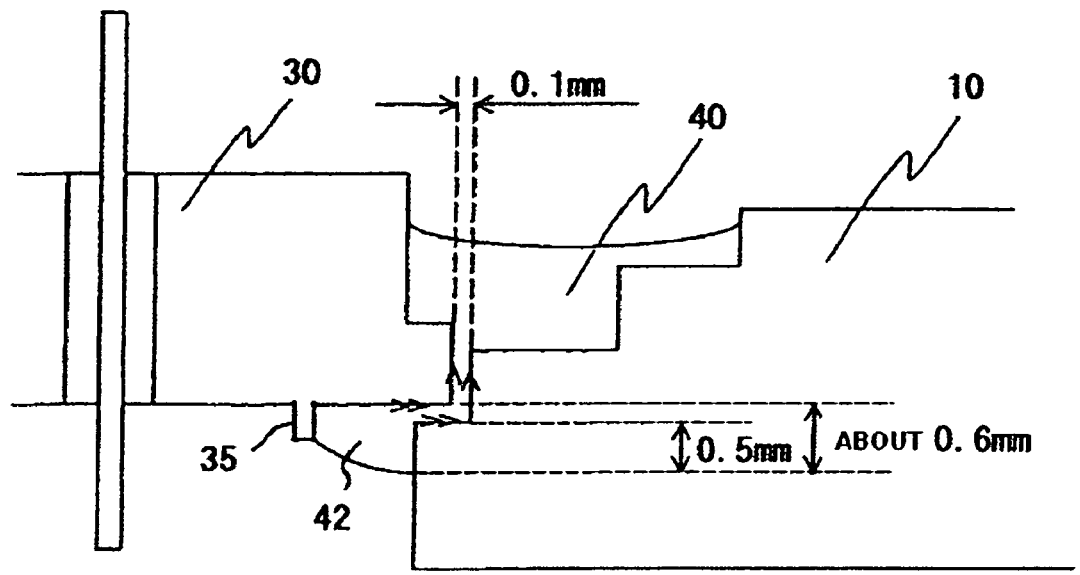
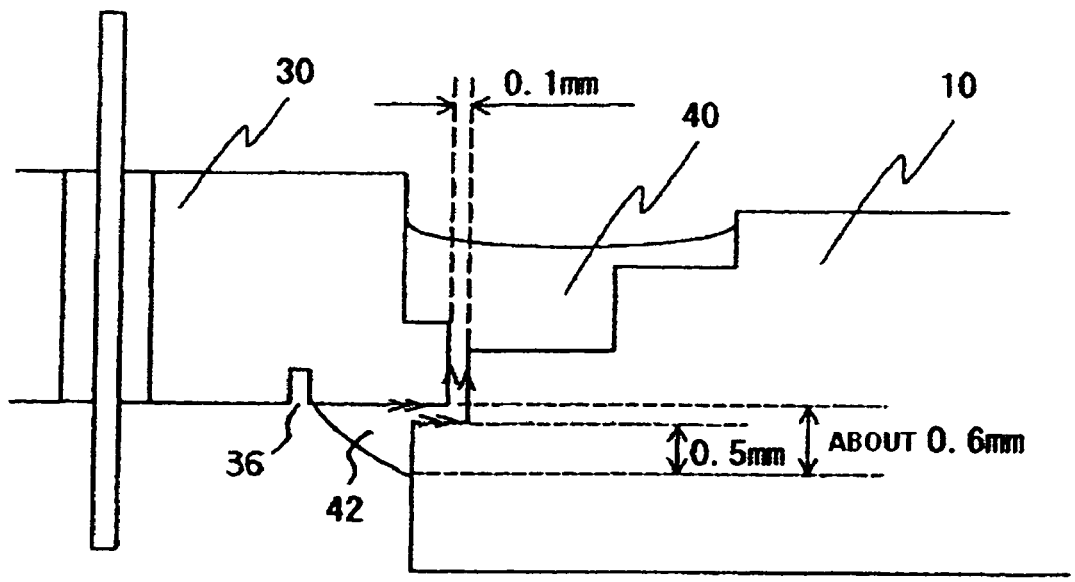

Fig.10
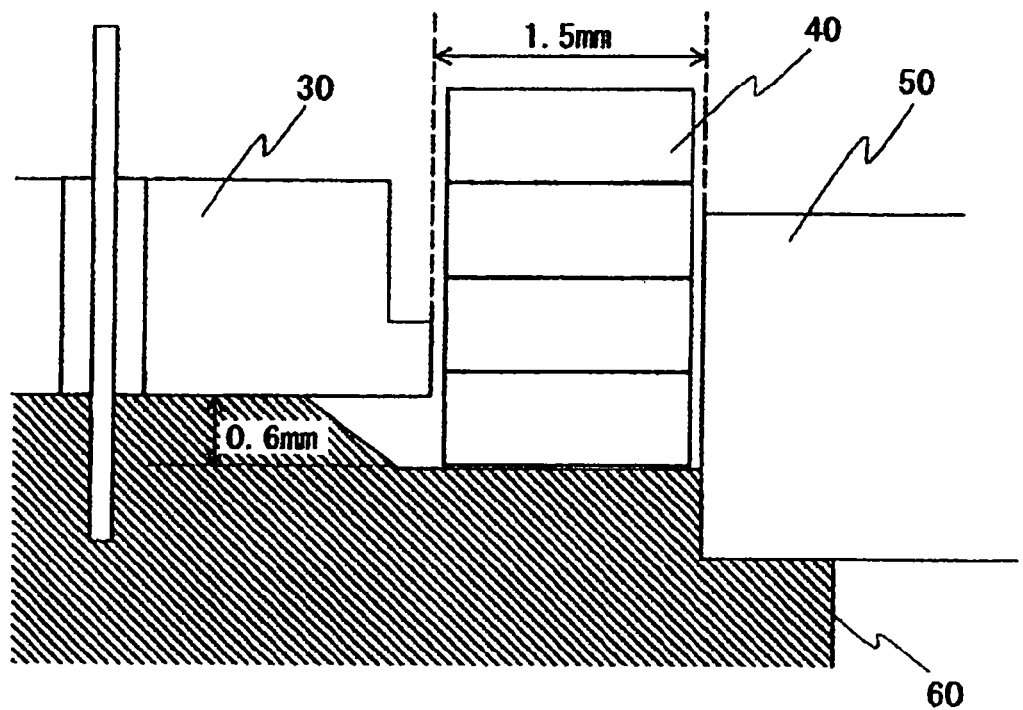
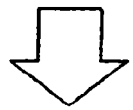
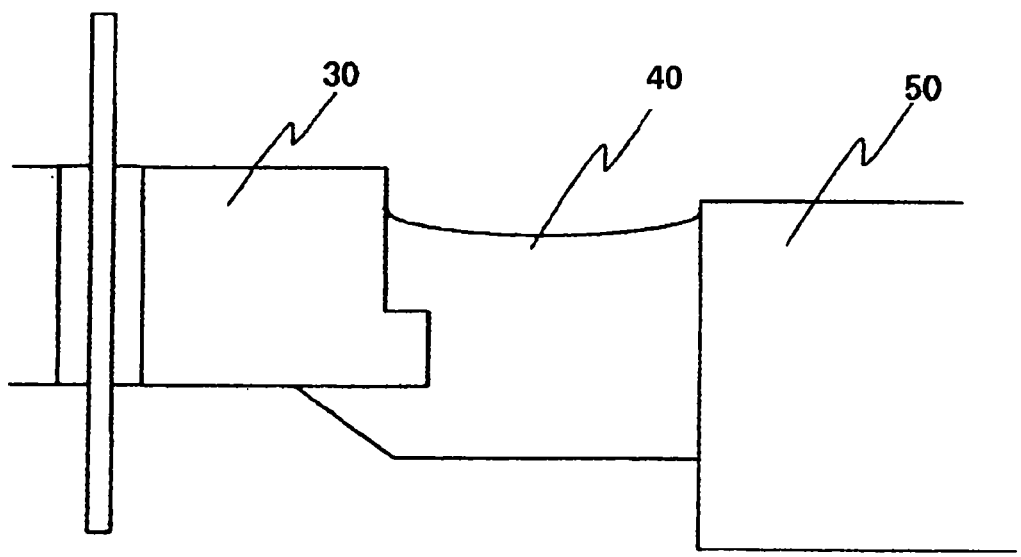

MAGNETIC DISK DRIVE FEED-THROUGH SOLDER CONNECTION WITH SOLDER FILLET FORMED INSIDE BASE AND PROTRUDING OUTSIDE BASE

CROSS-REFERENCE TO RELATED APPLICATION

The instant nonprovisional patent application claims priority to Japanese Patent Application No. 2007-110485 filed Apr. 19, 2007 and which is incorporated by reference in its entirety herein for all purposes.

BACKGROUND OF THE INVENTION

In recent magnetic disk drives, a disk is rotated at high speed, and a head gimbal assembly is driven at high speed to meet a need for large capacity and high recording density. Therefore, air disturbance (wind turbulence) may occur at a relatively high possibility, causing vibration in disk or head gimbal assembly. The wind turbulence vibration may significantly obstruct positioning of a head on a track on a disk being subjected to high-density recording. Since wind turbulence is caused by air disturbance, it randomly occurs, therefore magnitude or a period of wind turbulence is hardly predicted, and consequently when prompt and accurate positioning control of a head is attempted, the control may be complicated and difficult. Furthermore, the wind turbulence vibration may be a sound source of noises, that is, may be a factor of reducing quietness of a drive.

As another problem associated with high-speed rotation due to an effect of air in a drive, power consumption is increased. When a disk is rotated at high speed, air near the disk is drawn thereby and rotated together. On the other hand, since air away from the disk stays still, shear force is generated between the air and the disk, leading to a load of stopping the disk rotation. This is called windage loss, and the windage loss increases with increase in rotation speed. Motor output needs to be large to enable high speed rotation against the windage loss, which necessarily requires large power.

Here, noticing a fact that each of the wind turbulence and windage loss is proportional to density of gas within a drive, the following idea is previously considered: a low-density gas is enclosed in a sealed magnetic disk drive in place of air, so that the wind turbulence and windage loss are reduced.

As the low-density gas, hydrogen, nitrogen, helium and the like are considered. In the light of actual use, helium is considered to be optimal since it may exhibit a large effect, and may be stable and highly safe. A magnetic disk drive having helium gas being enclosed therein solves the above problem, and makes it possible to achieve prompt and accurate positioning control, power saving, and high quietness. In the case that power saving is not considered, it further makes it possible to achieve faster disk rotation or faster driving of a head gimbal assembly, consequently drive performance can be improved.

However, since helium has an extremely small molecular size, and has a large diffusion coefficient, a housing used for a typical magnetic disk drive inevitably has a problem that since sealing ability is bad, helium easily leaks out, resulting in difficulty in keeping drive performance. Thus, for example, a conventional example as described in U.S. Patent Publication No. 2005/0068666 ("patent document 1") is proposed to making it possible to enclose helium, which is leaky, for a long period.

FIG. 14 shows an example of a section diagram of the sealed magnetic disk drive as above. Here, as a region where helium may leak from a housing at a high possibility, a joined region between a base 200, on which a device component 210 is mounted, and a cover 220 is given. To perfectly seal the relevant region, at the joining position 240, an upper part of a side wall of the base 200 and the cover 220 are welded by laser or joined by soldering to each other.

When laser welding or solder joining is performed, material of each of the base 200 and the cover 220 needs to be selected from a viewpoint of durability or reliability and cost. For example, a base molded by aluminum die casting and an aluminum cover formed by pressing or cutting may be selected. Alternatively, a base formed of an aluminum alloy containing a relatively small amount of copper and magnesium by means of cold forging, and an aluminum cover formed by pressing or cutting may be selected.

Furthermore, as a region where helium may leak from a housing at a high possibility, a small opening in a base bottom is given, which is formed for passing electric wires connecting between a flexible printed circuit (FPC) assembly in the housing and a circuit board outside the housing. To perfectly seal that opening while establishing electric wiring, a feed-through 250 having a plurality of pins 260 as shown in FIG. 14 is used, and wiring lines at an FPC assembly side are connected to pins within the housing, and wiring lines at a circuit board side are connected to pins outside the housing.

FIGS. 15 and 16 show a side diagram and a top diagram of the feed-through 250 respectively. A flange 252 of the feed-through 250 is joined by soldering 300 to a stepped portion of the opening in the bottom of the base 200 at a joining position 270 with the base 200. A plurality of steel pins 260 are provided in the flange 252 in a manner of extending in a perpendicular direction to a flange 252 plane. In such a configuration, a sealing material 280 such as glass or ceramic is filled in a space between the flange 252 and each of the steel pins 260 so as to enclose the periphery of each steel pin 260. A material of the flange 252 is selected to be fitted with the sealing material 280 and a material of the base 200 so as to reduce stress applied to the joining position 270. When the base 200 includes aluminum, the flange 252 includes a nickel alloy or stainless steel.

The feed-through is soldered to the base according to the following procedure.

(1) A feed-through or base being subjected to nickel plating is coated with flux at a portion requiring good solder wetting.

(2) The feed-through is disposed on a stepped portion of a base opening.

(3) Flux is supplied into a gap caused by the stepped portion of the base between the feed-through and the base, then a solder material having an oval shape is disposed thereon.

(4) The whole base having the feed-through mounted therein is heated by a reflow furnace.

(5) When heating is finished, and cooling is completed, the residue of the flux and the like on the base are washed.

FIG. 17 shows a cross section of a soldered portion. Melted solder 300 is distributed through spreading by wetting over a narrow gap area between the feed-through 250 and the base 200. Moreover, as seen in FIG. 18 showing the solder-joined portion in an enlarged manner, a feed-through surface and a base surface, between which solder is interposed, are in a parallel relationship, and therefore most of solder is remained in the gap area, and has a planar, thinly-spread shape. Therefore, even if Sn-3Ag-0.5Cu (mass percent), of which the joining reliability level is highest among all kinds of lead-free solder, is used as solder, when a temperature cycle test is performed to the joined portion as an acceleration test, actual-use life of five years cannot be achieved, and it has been found that a crack generated in the solder-joined portion is sometimes formed into a leak path of the low-density gas.

The reason for this is that a componential material of the flange of the feed-through is Kovar™ being one of iron-based materials (linear expansion coefficient: about 5 ppm/° C.) in many cases, and a componential material of the base is an aluminum-based alloy (linear expansion coefficient: about 12 ppm/° C.), that is, since a difference in linear expansion coefficient exists between the members, a solder material that joins between the materials cannot stand a thermomechanical load generated between these different materials in an early stage during actual use.

The reason why the linear expansion coefficient of Kovar™ as the componential material of the flange of the feed-through needs to be significantly smaller than that of the aluminum-based alloy as the material of the base is because a seal material such as glass or ceramic is used for isolation between the flange of the feed-through and steel pins for electric signal transmission of the feed-through, and difference in linear expansion coefficient between the seal material and the material of the flange of the feed-through needs to be reduced for preventing a phenomenon that a gap is formed between both materials due to temperature change under use environment, and the low-density gas leaks through the gap.

BRIEF SUMMARY OF THE INVENTION

Embodiments of the present invention help to achieve a solder joining structure having high reliability, in which even if a componential material of a flange of a feed-through of a sealed magnetic disk drive is an iron-based material such as Kovar™, and a componential material of a base of the drive is an aluminum-based alloy, leakage of low-density gas is drastically reduced. According to the particular embodiment of FIG. 1, a base 10 has a stepped portion 22 in the inside of a periphery of an opening 20, and an inclined surface 26 extending to the outside of the base 10 is formed at an edge of a surface 24 of the stepped portion 22, on which a flange 32 of a feed-through 30 is placed, thereby when the stepped portion 22 of the base is joined by soldering with the flange 32 of the feed-through, a solder fillet 42 is formed not only in the inside of the base 10, but also in the outside thereof.

BRIEF DESCRIPTION OF THE DRAWINGS

FIG. 4 shows a perspective diagram showing a condition that solder preforms are disposed in a gap between the base and the feed-through;

FIGS. 5(a) and 5(b) are partial section diagrams showing details of the solder joining structure according to the example 1;

FIGS. 6(a) and 6(b) are partial section diagrams showing a solder joining structure according to example 2;

FIG. 10 shows a diagram for illustrating a method of solder joining between a base and a feed-through;

DETAILED DESCRIPTION OF THE INVENTION

Embodiments of the present invention relate to a magnetic disk drive, and in particular, to a sealed magnetic disk drive suitable for enclosing a low-density gas such as helium gas within the drive.

An object of embodiments of the present invention is to achieve a solder-joined structure having high reliability, in which even if the linear expansion coefficient of the componential material of the flange of the feed-through is significantly smaller than the linear expansion coefficient of the componential material of the base, the low-density gas hardly leaks.

To solve the above problem, embodiments of the invention are characterized in that fluidity or wetting ability of solder is locally controlled in a joined portion between a base and a feed-through of a sealed magnetic disk drive, so that a solder fillet (three-dimensional solder pool having a simple surface configuration, which is stably formed using surface tension of solder during solder melting in soldering) is formed not only in the inside of the base, but also in the outside thereof. Moreover, the solder fillet is controlled to stably have a uniform shape.

Specifically, a region having an increased angle that is formed by a feed-through surface and a base surface, between which solder is interposed, is provided in a stepped portion of the base, on which a flange of the feed-through is placed, thereby an area where solder has a thin and flat shape is decreased, and an area where solder has a three-dimensional shape is increased. Thus, melted solder easily flows on the area with such a three-dimensional shape, consequently the solder can be uniformly extended over the whole joined portion.

According to embodiments of the invention, leak life through a joined feed-through portion of a low-density gas enclosed in a housing is improved, and a perfect sealing structure using reliable solder joining can be achieved, in which the low-density gas does not leak during actual use.

Moreover, perfectly enclosed helium makes it possible to achieve prompt and accurate positioning control, power saving, and high quietness. In the case that power saving is not considered, it further makes it possible to achieve faster disk rotation or faster driving of a head gimbal assembly, consequently drive performance can be improved.

Furthermore, a perfectly sealed housing makes it possible to remove effects of atmospheric pressure variation or humidity variation on HDA, consequently degradation by oxidization of motor oil or the like in the HDA can be prevented.

Figure 11:
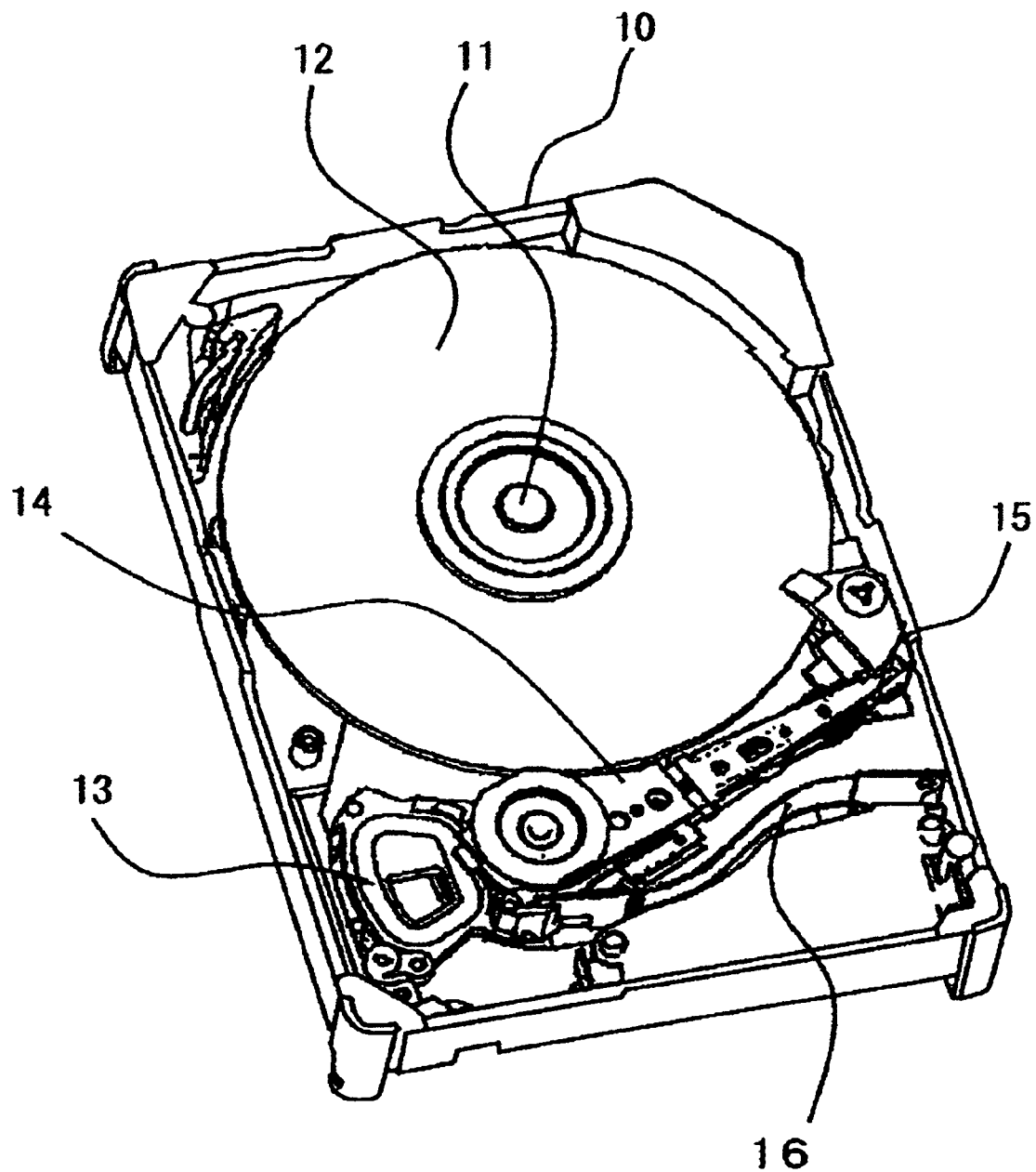
FIG. 11 shows a block diagram of a magnetic disk drive to which embodiments of the invention are applied.

FIG. 11 shows a top diagram of a sealed magnetic disk drive, to which the invention is applied, with a housing cover being not set. In FIG. 11, a spindle motor 11 and a magnetic disk 12 as an information recording/reproducing medium, which is rotationally driven by the spindle motor 11, are provided in a base 10 that configures a housing. In addition, an actuator assembly 13 including a voice coil motor and a head gimbal assembly 14, which is rotationally driven by the actuator assembly 13, are provided therein. A magnetic head 15 for recording and reproducing information into/from the magnetic disk 12 is provided on a tip of the head gimbal assembly 14 via a slider having an air bearing surface (ABS) between the slider and the magnetic disk 12, and the head gimbal assembly 14 is rotationally driven in a radial direction of the magnetic disk 12 so that the magnetic head 15 is positioned at a point on the magnetic disk 12 for recording and reproducing. Furthermore, an FPC assembly 16 connects between the magnetic head 15 or each motor and a circuit board outside the housing for controllably driving the magnetic head 15 or the motor in order to transmit information to be recorded or reproduced by the magnetic head 15, or transmit a current for driving each motor. The magnetic disk drive is operated by the spindle motor 11, magnetic disk 12, actuator assembly 13, head gimbal assembly 14, and FPC assembly 16 (which are called HDA below) within the housing, and by the circuit board outside the housing. Helium is injected into the housing having the HDA mounted therein, thereby a sealed magnetic disk drive is formed.

Figure 12:
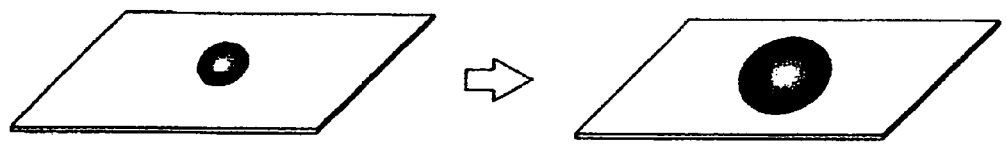
FIG. 12 shows a diagram for illustrating a principle of embodiments of the invention.
Figure 13:
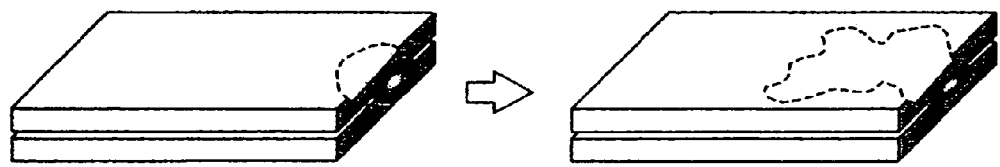
FIG. 13 shows a diagram for illustrating the principle of embodiments of the invention.
Figure 14:
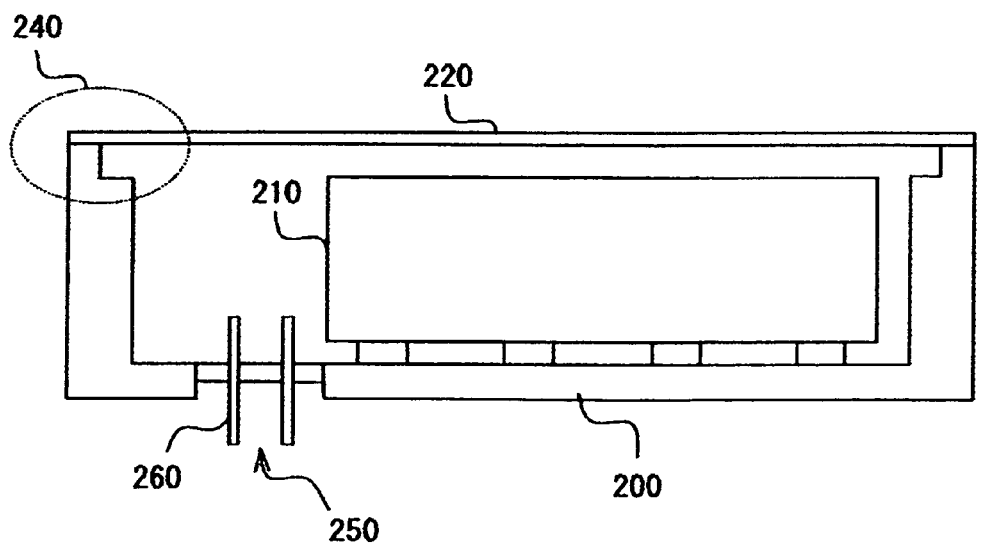
FIG. 14 shows a cross section diagram showing a prior-art, sealed magnetic disk drive.
Figure 15:
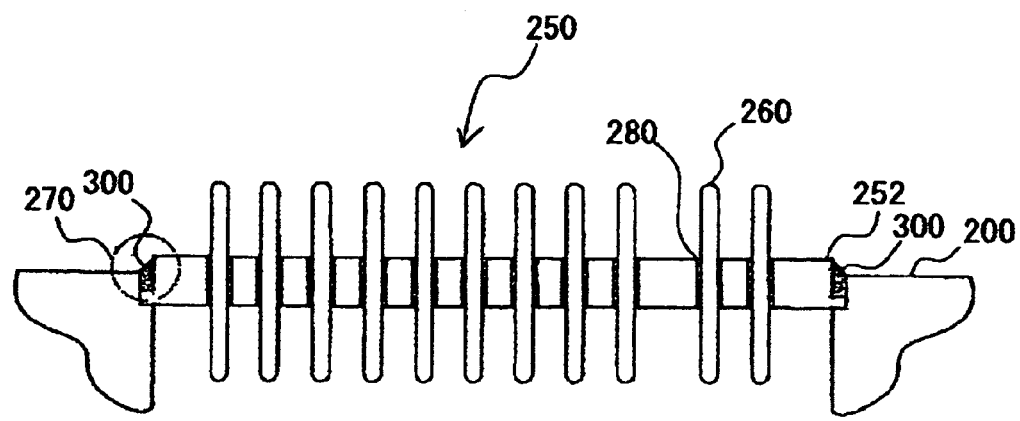
FIG. 15 shows a side diagram of a feed-through of the prior-art, sealed magnetic disk drive.
Figure 16:
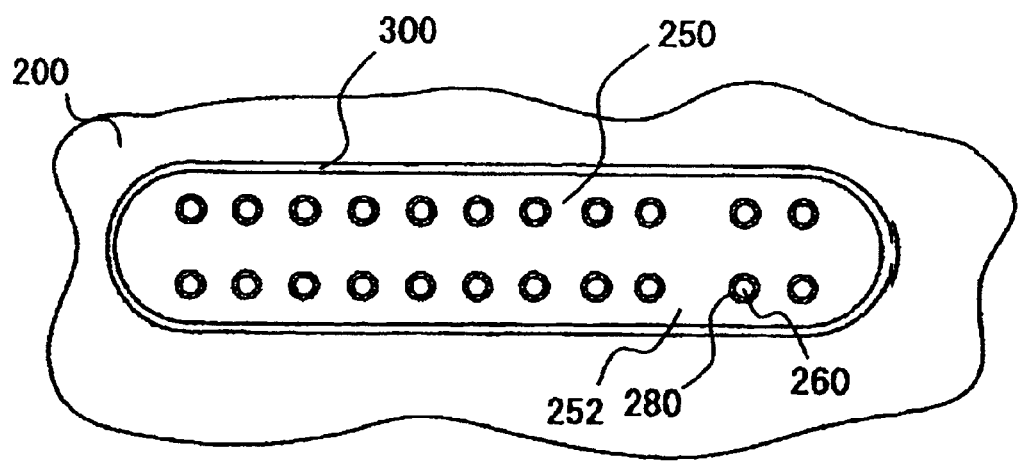
FIG. 16 shows a top diagram of the feed-through of the prior-art, sealed magnetic disk drive.
Figure 17:
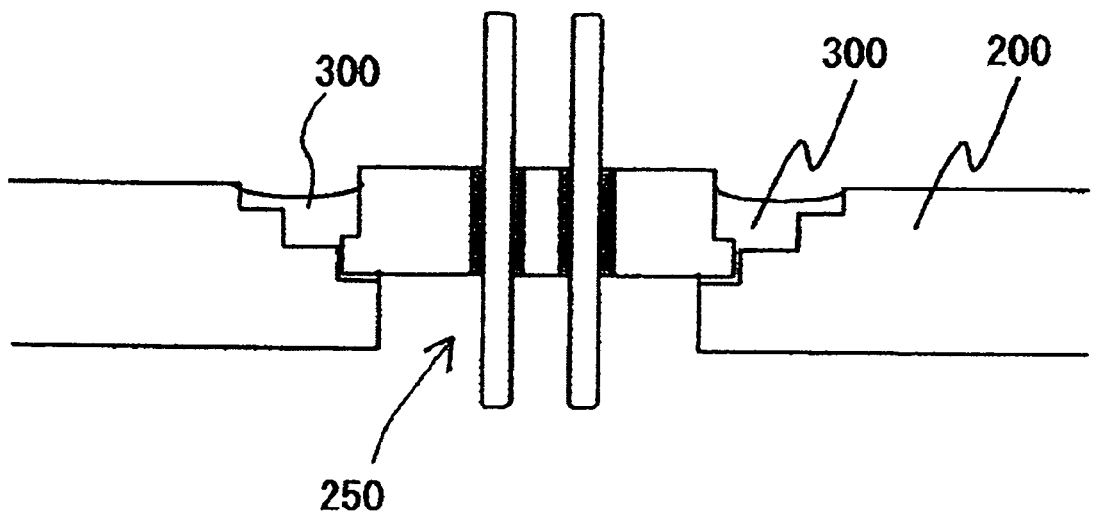
FIG. 17 shows a cross section diagram showing a joined feed-through portion of the prior-art, sealed magnetic disk drive.

Next, before describing specific examples of the invention, a principle of embodiments of the invention is described. Wetting ability of solder is uniquely determined by a wetting angle of the solder to another member, that is, it is determined by an angle formed by a surface of melted solder and a surface of a member to be joined at an edge of the melted solder at a point when spreading by wetting of the melted solder reaches an equilibrium state. When a small amount of solder is spread by wetting on a simple plane as shown in FIG. 12, the solder is spread by wetting in an approximately circular form, and such spreading is completed or reaches an equilibrium state in a short time. However, as shown in FIG. 13, when a large amount of solder needs to be passed through a narrow gap between different structures in order to achieve wetting of the solder, a rate of spreading by wetting becomes different depending on regions. As a result, a larger amount of solder is supplied to a region where spreading by wetting is fast, and the amount of solder is decreased in a region where spreading by wetting is slow, so that size of a solder fillet may be different depending on regions.

On the other hand, after solder joining, even if the feed-through surface and the base surface make different motions upon temperature change during actual use due to difference in linear expansion coefficient between the surfaces, a solder fillet, which joins the feed-through to the base, absorbs strain. However, when such absorption of strain by solder is repeated, a crack may occur at a region where maximum strain suddenly occurs, and the crack may develop from the region to another region. When the crack penetrates the inside of the solder, the crack may become a leak path of the low-density gas enclosed in the housing.

When a feed-through is joined, it is obvious that when a larger solder fillet is formed, formation of a penetrated crack through such a portion, namely, formation of a leak path of the low-density gas takes more time, therefore sealing life is prolonged. That is, joining reliability is improved. However, if a relatively small solder fillet is formed in another portion at the same time, a leak path is formed in such a portion in a shorter time, consequently sealing life is reduced for the whole joined portion. That is, joining reliability is reduced. In other words, if a solder fillet generally has approximately the same dimension, the best joining reliability is obtained.

When a region where solder supply is increased, that is, spreading by wetting is relatively fast is compared to a region where solder supply is decreased, or spreading by wetting is relatively slow, the former has a structure that facilitates solder flow, or it is in a good wetting condition. Therefore, it is enough that fluidity or wetting ability of solder is locally controlled in a joining structure so that respective solder fillets generally have approximately the same size.

Hereinafter, examples of particular embodiments are described in detail with reference to the drawings.

EXAMPLE 1

Figure 1:
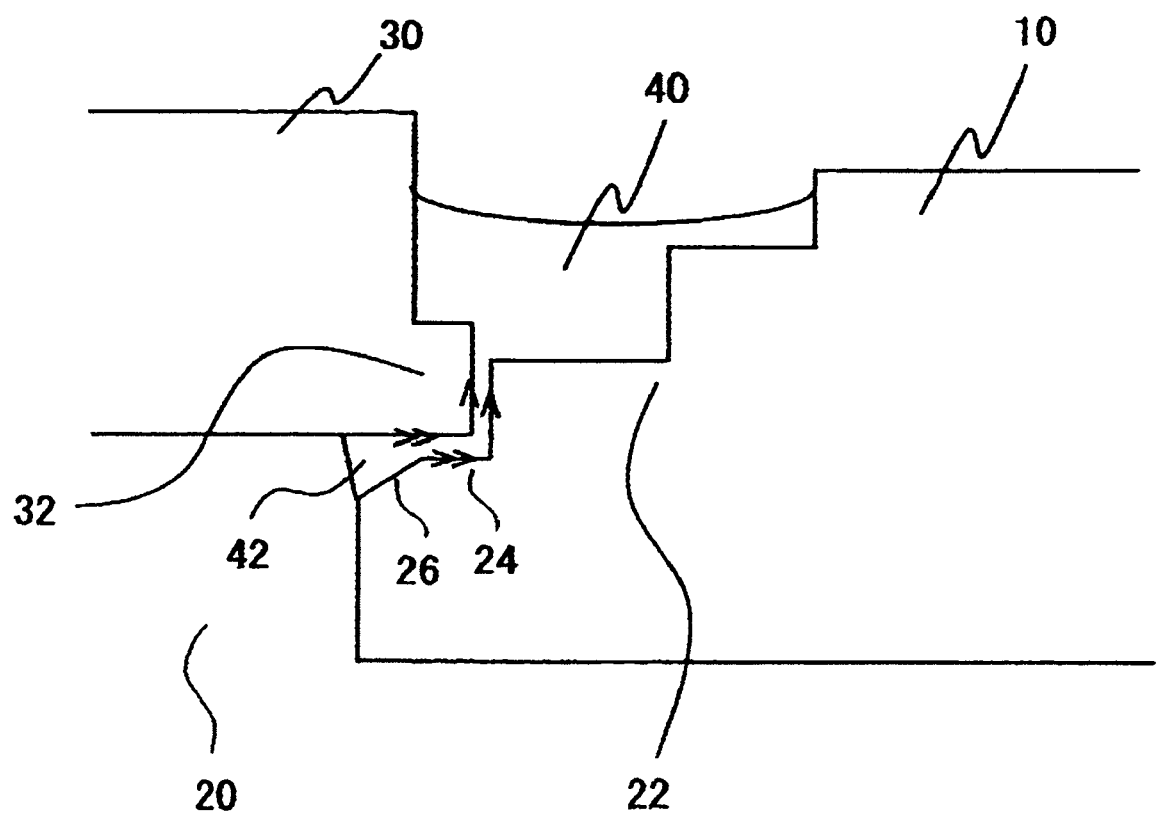
FIG. 1 shows a partial section diagram showing a solder joining structure according to example 1.
Figure 2:
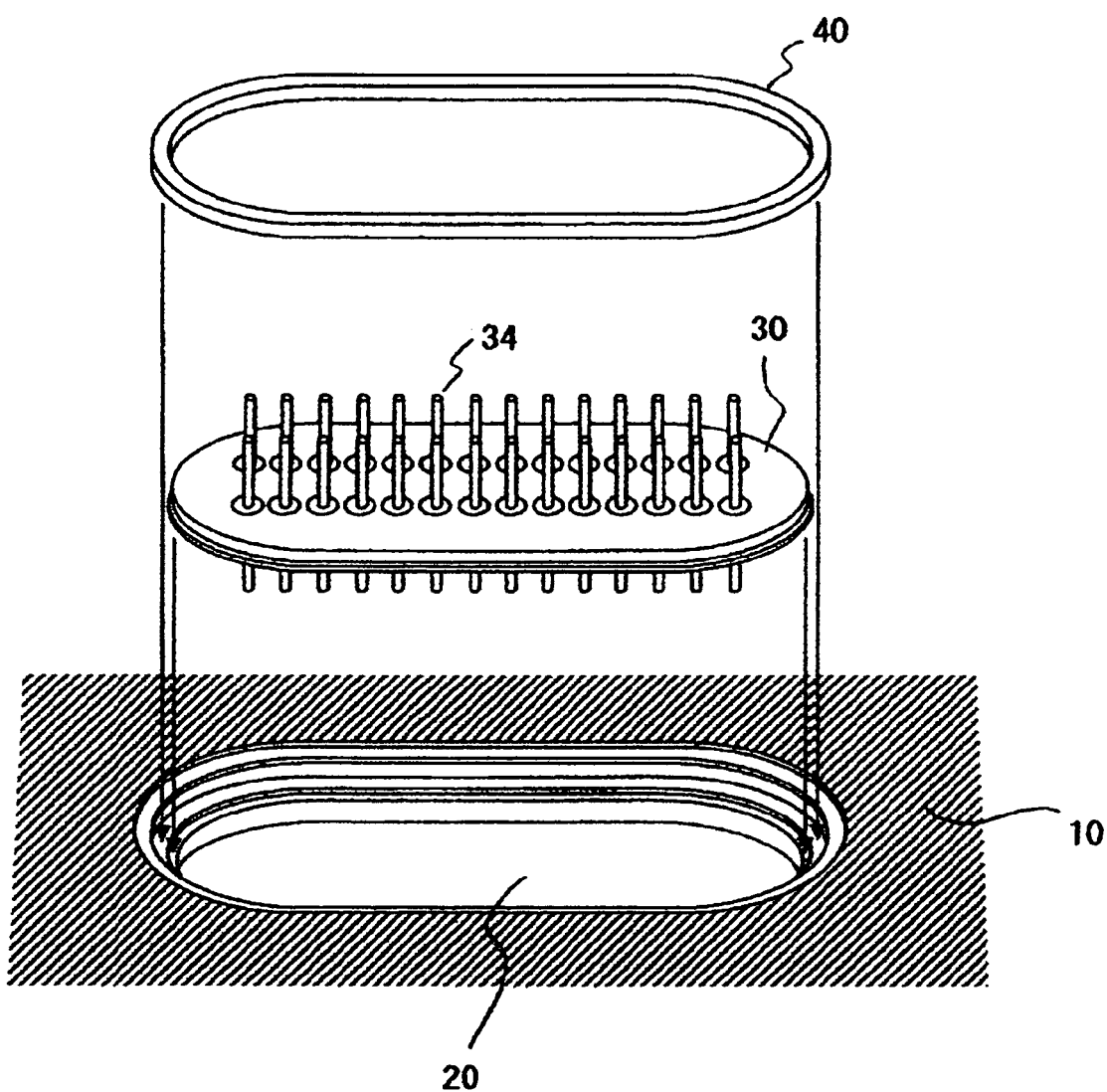
FIG. 2 shows a diagram showing a relationship before joining between a periphery of an opening of a base, a feed-through, and solder.

A configuration of a base is described with reference to FIGS. 1 and 2. FIG. 1 shows a cross section diagram of a joined portion between the base and a feed-through. FIG. 2 shows a diagram showing a relationship before joining between a periphery of an opening of the base, the feed-through, and solder. An opening 20 for mounting a feed-through 30 is provided in a bottom of a base 10, and a stepped portion 22 is provided on the inside of the periphery forming the opening 20. The stepped portion 22 is configured by three-stage stepped surfaces, in which a stepped surface 24 facing the opening 20, on which a flange 32 of the feed-through 30 is placed, has an edge opposed to the opening 20, which has an inclined surface 26 extending to the outside of the base 10.

Next, with reference to FIGS. 1 to 4, description is made on a procedure of producing a sealed magnetic disk drive in which the base 10 is joined by soldering with the feed-through 30 to enclose a low-density gas.

As solder, a solder preform 40 was used, which had a composition of Sn-3Ag-0.5Cu (weight percent), and had a width of 1.0 mm and a thickness of 1.0 mm, and is in an oval shape in accordance with a peripheral form of the feed-through 250.

Figure 3:
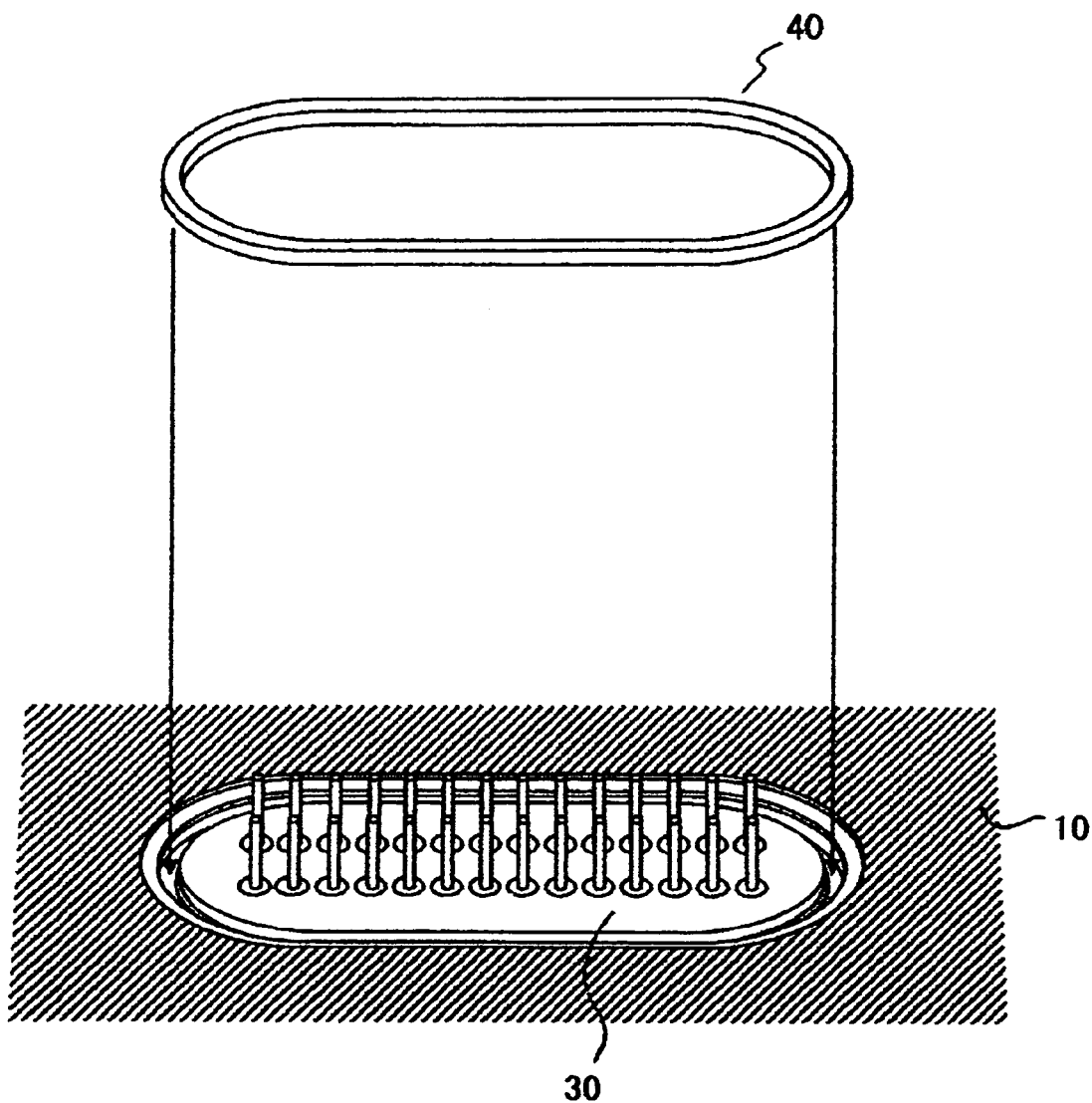
FIG. 3 shows a perspective diagram showing a condition that the feed-through is disposed on a stepped portion of the base.
Figure 4:
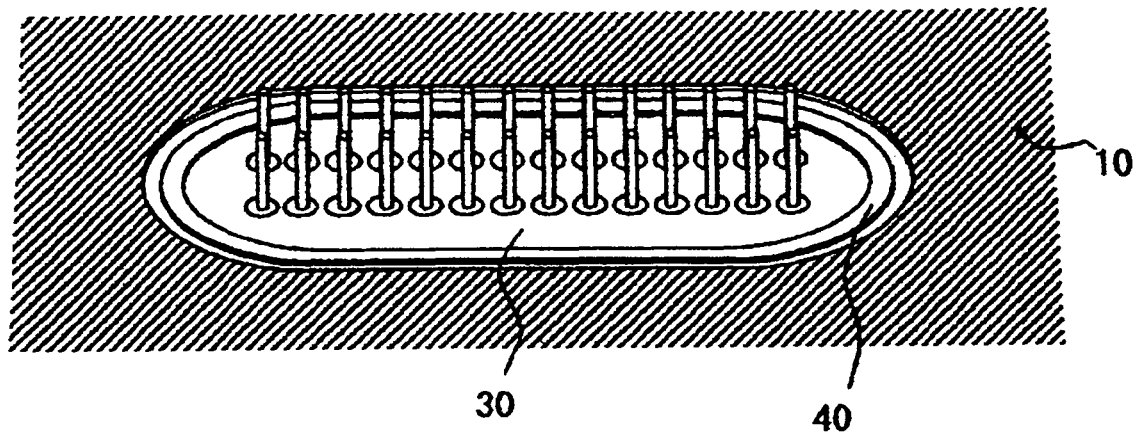

As shown in FIG. 3, the flange 32 of the feed-through 30 was disposed on the stepped surface 24 of the stepped portion 22 of the base 10, then as shown in FIG. 4, two solder preforms 40 were disposed in a gap between the base 10 and the feed-through 30, and then flux containing 2% chlorine was supplied into the gap, and then such a structure was heated by a reflow furnace so that the two solder preforms 40 were melted, and consequently solder joining was made as shown in FIG. 1.

At that time, since the edge of the stepped surface 24 of the base 10 includes the inclined surface 26, an angle formed by a feed-through surface and a base surface, between which the solder is interposed, is not parallel, and the angle is increased toward the outside of the base from the middle. In a portion where the angle is increased, fluidity or wetting ability of the solder is improved, therefore the solder fillet 42 is formed not only in the inside of the base, but also in the outside thereof, and the solder fillet 42 has a three-dimensional shape. The solder fillet 42 is made to have the three-dimensional shape, thereby a thermomechanical load to the solder can be reduced. FIG. 5(a) shows an example in the case that the angle is 45°, and FIG. 5(b) shows an example in the case that the angle is 90°. Hereinafter, they are called 45° product and 90° product respectively.

Next, using the base 10 of each of the 45° product and the 90° product, as described in FIG. 11, the disk 12, the spindle motor 11 for rotationally driving the disk 12, the head 15 for recording and reproducing information on the disk, the head gimbal assembly 14 for moving the head 15 to an optional position on the disk, the actuator assembly 13 for driving the head gimbal assembly 14, and the FPC assembly 16 for electrically connecting between the head, spindle motor, and actuator assembly were mounted on the base, then the FPC assembly 16 was electrically connected to respective pins 34 of the feed-through 30, and then a cover was joined to the base 10 by welding, and consequently a sealed magnetic disk drive was produced, in which a low-density gas was enclosed in a space formed through such joining. While not shown, sealed magnetic disk drives were also produced using bases of a 30° product and a 135° product respectively.

Figure 18:
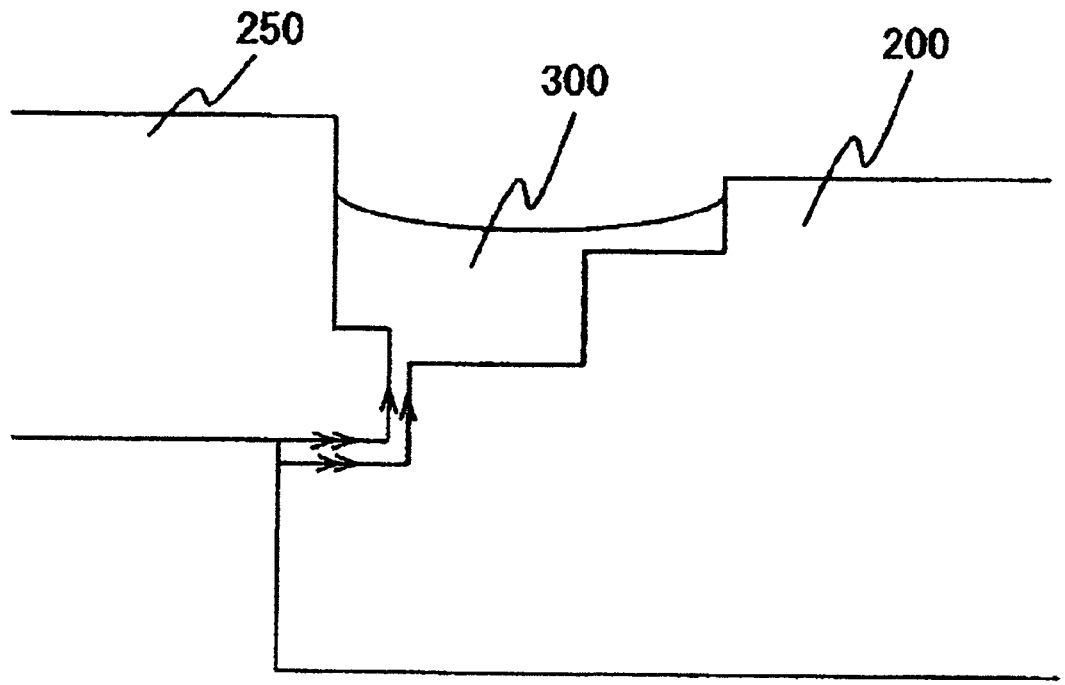
FIG. 18 shows a partially enlarged section diagram of the joined portion shown in FIG. 17.

To evaluate an enclosing life of a low-density gas of each of the sealed magnetic disk drives, a temperature cycle test was carried out. For comparison, a magnetic disk drive using a base according to a prior-art specification was also prepared, in which the feed-through surface and the base surface, between which the solder was interposed, were parallel to each other as shown in FIG. 18.

In the case of the magnetic disk drive in the prior-art specification, since the solder fillet was able to be formed only in the inside of the base, one solder preform was used.

The magnetic disk drives were prepared 10 for each condition, and prepared 50 in total, and helium was used as the low-density gas, and a drive having a leak rate of $1*10^{-11}$ (Pa·m$^3$/sec) or less was assumed as an acceptable drive. As a result, the number of drives that was able to achieve a target actual-use life of five years in each sample was as follows.

Prior-art product; 3 out of 10
30° product; 7 out of 10
45° product; 7 out of 10
90° product; 10 out of 10
135° product; 7 out of 10

From the results, it was known that when the angle formed by the feed-through surface and the base surface, between which the solder was interposed, was increased rather than made to be parallel, an effect was obtained for improving enclosing reliability of the low-density gas by using solder. This is because melted solder easily flew on a portion having a three-dimensional shape, consequently the melted solder was uniformly supplied over the whole joining portion.

Moreover, after solder joining, even if the feed-through surface and the base surface make different motions upon temperature change during actual use due to difference in linear expansion coefficient between the surfaces, since the solder interposed between the surfaces has the three-dimensional shape, the amount of strain per unit volume of solder is drastically decreased, so that the solder can be easily deformed, consequently damage to the solder due to fatigue can be reduced.

In this way, a region in which a thermomechanical load to solder is reduced is formed, thereby formation of the leak path of the low-density gas within the solder can be delayed.

EXAMPLE 2

FIG. 6 shows a cross section of a joined portion between a base and a feed-through of a sealed magnetic disk drive according to example 2. A base 10 corresponds to the 90° product base in the example 1. A feed-through 30 includes a feed-through shown in FIG. 6(*a*), in which a bank 35 having a width of 0.2 mm and a height of 0.3 mm is formed on an edge of a surface of a portion, which does not require solder wetting, of a flange, and includes a feed-through shown in FIG. 6(*b*), in which a groove 36 having a width of 0.2 mm and a depth of 0.3 mm is formed on an edge thereof.

As in the example 1, two solder preforms 40 were used, each of which had a composition of Sn-3Ag-0.5Cu (weight percent), and had a width of 1.0 mm and a thickness of 1.0 mm, and was in an oval shape. The base 10 was joined by soldering with the feed-through 30 according to the same procedure as in the example 1. Then, as in the example 1, components of the magnetic disk drive were mounted on the base 10, and then the base was joined with the cover, so that a low-density gas was enclosed in a housing.

To evaluate an enclosing life of a low-density gas of each of the magnetic disk drives, a temperature cycle test was carried out as in the example 1. As a result, the number of drives that was able to achieve a target actual-use life of five years in each sample was as follows.

Bank-formed product; 10 out of 10
Groove-formed product; 10 out of 10

In this way, the bank or groove is formed on the edge of the portion, which does not require solder wetting, of the feed-through surface, thereby when melted solder spreads by wetting and reaches a region where a surface of the bank or groove has a convex shape, the melted solder follows the convex shape and therefore surface energy must be increased, which obstructs progress of wetting. Therefore, since spreading of a solder fillet formed outside the base can be stopped at a position of the bank or groove, a shape of the solder fillet can be controlled to have a uniform dimension. That is, the shape of the solder fillet can be stabilized.

EXAMPLE 3

Figure 7:
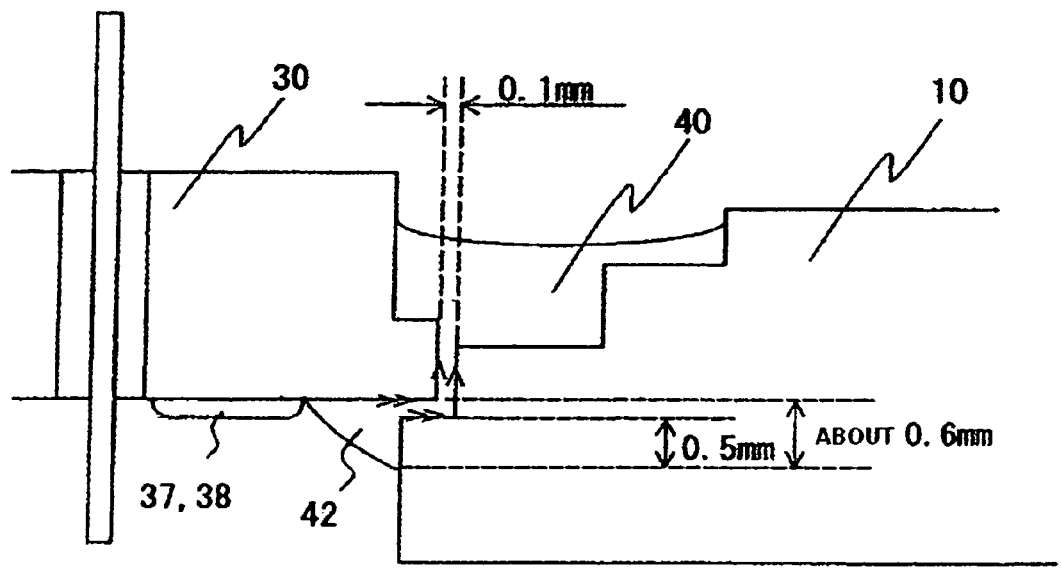
FIG. 7 shows a partial section diagram showing a solder joining structure according to example 3.

FIG. 7 shows a section of a joined portion between a base and a feed-through of a sealed magnetic disk drive according to example 3. A base 10 corresponds to the 90° product base in the example 1. In a feed-through 30, a portion that does not require solder wetting is coated with a solder resist 37, or attached with a masking tape 38.

As in the example 1, two solder preforms 40 were used, each of which had a composition of Sn-3Ag-0.5Cu (weight percent), and had a width of 1.0 mm and a thickness of 1.0 mm, and was in an oval shape. The base 10 was joined by soldering with the feed-through 30 according to the same procedure as in the example 1. Then, as in the example 1, components of the magnetic disk drive were mounted on the base 10, and then the base was joined with the cover, so that a low-density gas was enclosed in a housing.

To evaluate an enclosing life of a low-density gas of each of the magnetic disk drives, a temperature cycle test was carried out as in the example 1. As a result, the number of drives that was able to achieve a target actual-use life of five years in each sample was as follows.

Solder resist-coated product; 10 out of 10
Masking tape-attached product; 10 out of 10

In this way, the portion, which does not require solder wetting, of the feed-through surface is coated with the solder resist, or attached with the masking tape, thereby spreading by wetting of solder is blocked, and consequently a shape of a solder fillet can be stabilized. Moreover, a flange itself of the feed-through needs not be subjected to additional, mechanical or chemical working to make the flange itself to have a complicated shape, therefore an obstacle for progressing wetting can be relatively easily provided.

EXAMPLE 4

Figure 8:
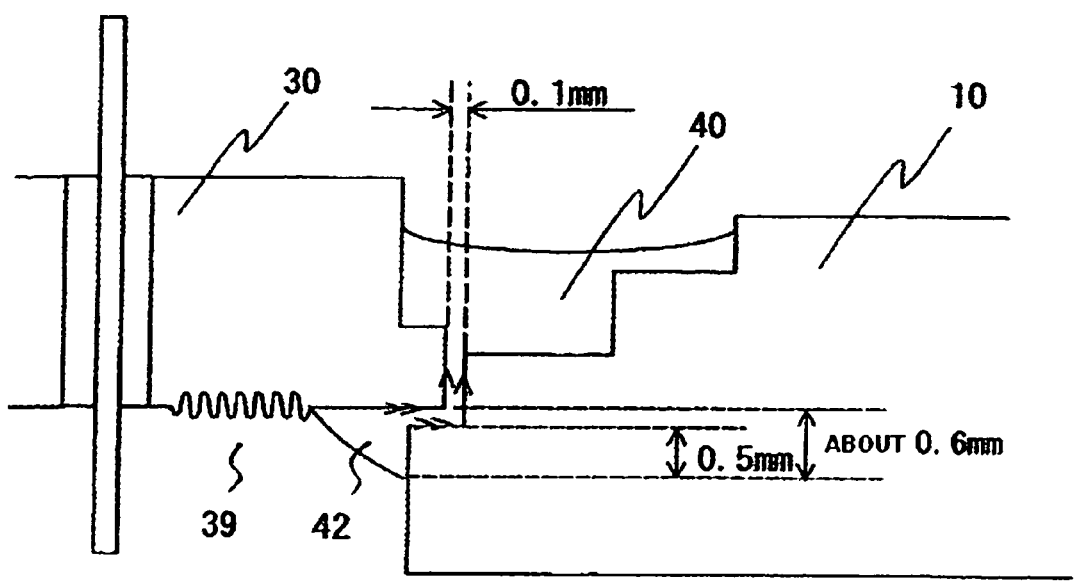
FIG. 8 shows a partial section diagram showing a solder joining structure according to example 4.

FIG. 8 shows a section of a joined portion between a base and a feed-through of a sealed magnetic disk drive according to example 4. A base 10 corresponds to the 90° product base in the example 1. A feed-through 30 is formed such that a surface-roughened region 39 for reducing wetting of solder is formed in a portion that does not require solder wetting by blast treatment or laser irradiation.

As in the example 1, two solder preforms 40 were used, each of which had a composition of Sn-3Ag-0.5Cu (weight percent), and had a width of 1.0 mm and a thickness of 1.0 mm, and was in an oval shape. The base 10 was joined by soldering with the feed-through 30 according to the same procedure as in the example 1. Then, as in the example 1, components of the magnetic disk drive were mounted on the base 10, and then the base was joined with the cover, so that a low-density gas was enclosed in a housing.

To evaluate an enclosing life of a low-density gas of each of the magnetic disk drives, a temperature cycle test was carried out as in the example 1. As a result, the number of drives that was able to achieve a target actual-use life of five years in each sample was as follows.

Blast-treated product; 10 out of 10
Laser-irradiated product; 10 out of 10

In this way, the portion, which does not require solder wetting, of the feed-through surface is subjected to surface modification by surface roughening, so that surface area of the portion, which does not require solder wetting, of the feed-through surface can be remarkably increased, and solder situated on an edge of the surface-roughened region generally has high surface energy at an interface between the solder and the feed-through, therefore further spreading by wetting can be blocked. Consequently, a shape of a solder fillet can be stabilized.

EXAMPLE 5

Figure 9:
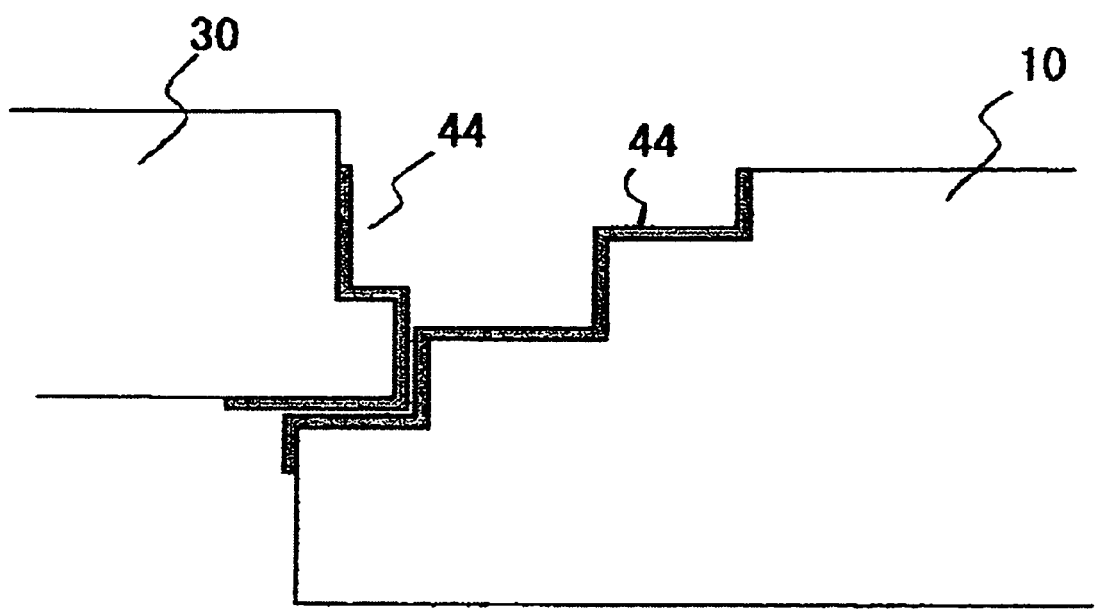
FIG. 9 shows a section diagram showing a joined portion between a base and a feed-through according to example 5.

FIG. 9 shows a section of a joined portion between a base and a feed-through of a sealed magnetic disk drive according to example 5. A portion, which requires wetting of solder, of each of the base 10 and the feed-through 30 is applied with a film 44 by plating or pre-soldering. In the case of plating, gold (Au), tin (Sn), and tin-2 mass % bismuth (Sn-2Bi) are used, and thickness is about 1 micrometer. In the case of pre-soldering, tin (Sn), tin-2 mass % bismuth (Sn-2Bi), and tin-1 mass % silver-57 mass % bismuth (Sn-1Ag-57Bi) are used, and thickness is about 10 micrometers.

As in the example 1, two solder preforms 40 were used, each of which had a composition of Sn-3Ag-0.5Cu (weight percent), and had a width of 1.0 mm and a thickness of 1.0 mm, and was in an oval shape. The base 10 was joined by soldering with the feed-through according to the same procedure as in the example 1. Then, as in the example 1, components of the magnetic disk drive were mounted on the base 10, and then the base was joined with the cover, so that a low-density gas was enclosed in a housing.

To evaluate an enclosing life of a low-density gas of each of the magnetic disk drives, a temperature cycle test was carried out as in the example 1. As a result, the number of drives that was able to achieve a target actual-use life of five years in each sample was as follows.

Gold-plated product, tin-plated product, Sn-2Bi plated product, tin-soldered product, and Sn-2Bi soldered product; 10 out of 10
Sn-1Ag-57Bi soldered product; 8 out of 10

In this way, when the portion, which requires wetting of solder, of each of the base and the feed-through is subjected to surface modification for improving wetting of solder by plating or pre-soldering, activity of flux can be relatively reduced, the flux being necessary to be separately supplied to enable spreading by wetting of melted solder to a required area. When activity of flux is reduced, wetting to areas other than the portion, which was subjected to the surface modification for improving wetting of solder, is reduced, and solder may wet to only the portion subjected to the surface modification, and spreading of the solder to the areas other than the portion can be hindered. Consequently, a shape of a solder fillet can be stabilized.

However, the following may be considered for the Sn-1Ag-57Bi soldered product. That is, since soldering thickness is large, 10 micrometers, namely, ten times larger than that in the case of plating, and a large amount of bismuth is contained, the soldered product is fused together with the Sn-3Ag-0.5Cu solder used for sealing during soldering, so that bismuth concentration is increased in solder after soldering, leading to reduction in fatigue resistance life.

EXAMPLE 6

In example 6, a method of solder joining between a base and a feed-through of a sealed magnetic disk drive is described with reference to FIG. 10. FIG. 10 shows a section of a joined portion between the base and the feed-through. The base 50 simply has an opening 20, and does not have a stepped portion in a periphery forming the opening. To produce a sealed magnetic disk drive enclosing a low-density gas, first, the base 50 was joined to the feed-through 30 using solder. As the solder, a solder preform 40 was used, which had a composition of Sn-3Ag-0.5Cu (weight percent), and had a width of 1.0 mm and a thickness of 1.0 mm, and was in an oval shape in accordance with a peripheral form of the feed-through. A procedure of the solder joining is as follows.

A horizontal gap between the feed-through 30 and the base 50 was set to be 1.5 mm. Then, while the feed-through was temporarily held by a Teflon (registered trademark) jig 60 at a position where the feed-through 30 was not directly supported by the base 50, and flied from the base 50, four solder preforms 40 were arranged in pile in a gap between the feed-through 30 and the base 50.

Then, flux containing 2% chlorine was supplied to a site of the solder preforms 40, and then the solder preforms 40 were melted by a reflow furnace to complete joining.

Next, as in the example 1, components of the magnetic disk drive were mounted on the base 50, then the base was joined with the cover to enclose a low-density gas in a housing.

To evaluate an enclosing life of a low-density gas of the magnetic disk drive, a temperature cycle test was carried out as in the example 1. As a result, the number of drives that was able to achieve a target actual-use life of five years was 10 out of 10.

In this way, a structure is used, in which the feed-through is not directly supported by the base, and flies from the base, thereby strain amplitude per unit volume of solder can be reduced, and consequently thermomechanical stress applied to solder can be reduced. Therefore, enclosing reliability of a low-density gas by solder can be improved.

What is claimed is:
1. A magnetic disk drive comprising a base accommodating,
   a disk,
   a spindle motor for rotationally driving the disk,
   a head for recording and reproducing information on the disk,
   a head gimbal assembly for moving the head to an optional position on the disk,
   an actuator assembly for driving the head gimbal assembly, and a flexible printed circuit (FPC) assembly for electrically connecting between the head, spindle motor, and actuator assembly, and a feed-through for electrical connection to the FPC assembly is mounted in an opening of the base, and the base is joined with a cover, so that a low-density gas is enclosed within the magnetic disk drive, characterized in that:

the base has a stepped portion in the inside of a periphery of the opening, and an inclined surface extending to the outside of the base is provided at an edge of a surface of the stepped portion for placing a flange of the feed-through, wherein the stepped portion of the base is joined by a solder fillet with the flange of the feed-through, wherein the solder fillet is formed in both of the inside and the outside of the base, and wherein a portion of the solder fillet formed outside of the base protrudes into the opening from an inner-most periphery of the opening adjacent the feed-through.

2. The magnetic disk drive according to claim 1, characterized in that: an angle of the inclined surface of the stepped portion of the base is about 30° degree to 135° degree with respect to a flat surface of the stepped portion.

3. The magnetic disk drive according to claim 1, characterized in that: a bank is provided on a periphery of a surface of the flange at a side to be subjected to solder joining with a certain distance from an edge of the relevant flange.

4. The magnetic disk drive according to claim 1, characterized in that: a groove is provided in a periphery of a surface of the flange at a side to be subjected to solder joining with a certain distance from an edge of the relevant flange.

5. The magnetic disk drive according to claim 1, characterized in that: a solder resist is coated on a periphery of a surface of the flange at a side to be subjected to solder joining with a certain distance from an edge of the relevant flange.

6. The magnetic disk drive according to claim 1, characterized in that: a masking tape is attached to a periphery of a surface of the flange at a side to be subjected to solder joining with a certain distance from an edge of the relevant flange.

7. The magnetic disk drive according to claim 1, characterized in that: a surface-roughened region is provided in a periphery of a surface of the flange at a side to be subjected to solder joining with a certain distance from an edge of the relevant flange.

8. The magnetic disk drive according to claim 1, wherein a surface of the solder fillet formed outside of the base is curved.

9. The magnetic disk drive according to claim 1, wherein a surface of the solder fillet formed outside of the base is (a) substantially straight and (b) not at a right angle with respect to the base.

* * * * *